United States Patent
Siegler et al.

(10) Patent No.: US 11,927,500 B2
(45) Date of Patent: Mar. 12, 2024

(54) METHOD AND DEVICE FOR CHARACTERIZING THE SURFACE SHAPE OF AN OPTICAL ELEMENT

(71) Applicant: Carl Zeiss SMT GmbH, Oberkochen (DE)

(72) Inventors: Steffen Siegler, Oberkochen (DE); Johannes Ruoff, Aalen (DE); Alexander Wolf, Essingen (DE); Michael Carl, Aalen (DE); Toralf Gruner, Aalen (DE); Thomas Schicketanz, Aalen (DE)

(73) Assignee: CARL ZEISS SMT GMBH, Oberkochen (DE)

( * ) Notice: Subject to any disclaimer, the term of this patent is extended or adjusted under 35 U.S.C. 154(b) by 0 days.

(21) Appl. No.: 17/720,344

(22) Filed: Apr. 14, 2022

(65) Prior Publication Data

US 2022/0236139 A1  Jul. 28, 2022

Related U.S. Application Data

(63) Continuation of application No. PCT/EP2020/075737, filed on Sep. 15, 2020.

(30) Foreign Application Priority Data

Oct. 14, 2019 (DE) ..................... 10 2019 215 707.6

(51) Int. Cl.
*G01M 11/00* (2006.01)
*G01B 9/02* (2022.01)
(Continued)

(52) U.S. Cl.
CPC ....... *G01M 11/005* (2013.01); *G01B 9/02011* (2013.01); *G01B 9/02039* (2013.01); *G01B 11/2441* (2013.01)

(58) Field of Classification Search
CPC ............ G01B 9/02011; G01B 9/02039; G01B 9/02072; G01B 9/02029; G01B 11/2441;
(Continued)

(56) References Cited

U.S. PATENT DOCUMENTS 10,422,718 B2* 9/2019 Stiepan .............. G01B 9/02085
2006/0250618 A1* 11/2006 Kawasaki .......... G01B 11/2441
356/512
(Continued)

FOREIGN PATENT DOCUMENTS

DE      102012217800 A1    4/2014
DE   10 2015 209 490 A1   11/2016
(Continued)

OTHER PUBLICATIONS

International Search Report, PCT/EP2020/075737, dated Dec. 10, 2020, 5 pages.
(Continued)

*Primary Examiner* — Michael A Lyons
(74) *Attorney, Agent, or Firm* — Edell, Shapiro & Finnan, LLC (57) ABSTRACT

Methods for characterizing the surface shapes of optical elements include the following steps: carrying out, in an interferometric test arrangement, at least a first interferogram measurement on the optical element by superimposing a test wave, which has been generated by diffraction of electromagnetic radiation on a diffractive element and has been reflected at the optical element, carrying out at least one additional interferogram measurement on in each case one calibrating mirror for determining calibration corrections, and determining the deviation from the target shape of the optical element based on the first interferogram measurement carried out on the optical element and the determined calibration corrections. At least two interferogram (Continued)

measurements are carried out for the at least one calibrating mirror, which differ from one another with regard to the polarization state of the electromagnetic radiation.

24 Claims, 4 Drawing Sheets

(51) Int. Cl.
*G01B 9/02001* (2022.01)
*G01B 11/24* (2006.01)

(58) Field of Classification Search
CPC ............. G01B 2290/70; G01M 11/005; G03F 7/70591
See application file for complete search history.

(56) References Cited

U.S. PATENT DOCUMENTS

| 2006/0274325 | A1 | 12/2006 | Hetzler et al. |
| 2010/0177321 | A1* | 7/2010 | Hetzler .............. G01B 9/02039 356/512 |
| 2015/0198438 | A1 | 7/2015 | Hetzler |
| 2016/0085061 | A1 | 3/2016 | Schwab |
| 2018/0106591 | A1 | 4/2018 | Hetzler et al. |
| 2021/0140762 | A1 | 5/2021 | Siegler et al. |

FOREIGN PATENT DOCUMENTS

| DE | 10 2018 211 853 A1 | 1/2020 | |
| JP | 2017116540 A * | 6/2017 | ........... G01B 21/042 |

OTHER PUBLICATIONS

Hwang et al., "Visibility Optimization of Phase-Shifting Diffraction-Grating Interferometer", Interferometry XII: Techniques and Analysis, SPIE vol. 5531, Aug. 2, 2004, pp. 383-394.

German Office Action with English translation, Application No. DE 10 2019 215 707.6, dated Jul. 1, 2022, 10 pages.

International Preliminary Report on Patentability, PCT/EP2020/075737, dated Apr. 19, 2022, 20 pages.

* cited by examiner

Fig. 1

METHOD AND DEVICE FOR CHARACTERIZING THE SURFACE SHAPE OF AN OPTICAL ELEMENT

CROSS REFERENCE TO RELATED APPLICATIONS

This is a Continuation of International Application PCT/EP2020/075737, which has an international filing date of Sep. 15, 2020, and which claims the priority of German Patent Application 10 2019 215 707.6, filed Oct. 14, 2019. The disclosures of both applications are incorporated in their respective entireties into the present Continuation by reference.

FIELD OF THE INVENTION

The invention relates to a method and a device for characterizing the surface shape of an optical element.

BACKGROUND

Microlithography is used for the production of microstructured components, such as for example integrated circuits or LCDs. The microlithography process is carried out in what is known as a projection exposure apparatus, which includes an illumination device and a projection lens. The image of a mask (=reticle) illuminated with the illumination device is in this case projected by the projection lens onto a substrate (e.g. a silicon wafer) coated with a light-sensitive layer (photoresist) and arranged in the image plane of the projection lens, in order to transfer the mask structure onto the light-sensitive coating of the substrate.

In projection lenses designed for the EUV range, i.e., at wavelengths of, e.g., approximately 13 nm or approximately 7 nm ("Extreme Ultraviolet"), mirrors are used as optical components for the imaging process owing to the lack of availability of suitable light-transmissive refractive materials. Typical projection lenses designed for EUV, as known e.g. from US 2016/0085061 A1, may have for example an image-side numerical aperture (NA) in the region of NA=0.55 and image an (e.g., ring-segment-shaped) object field into the image plane or wafer plane.

The increase of the image-side numerical aperture (NA) is typically accompanied by an enlargement of the required mirror areas of the mirrors used in the projection exposure apparatus. This in turn has the consequence that, in addition to manufacturing, testing the surface shape of the mirrors also presents a demanding challenge. Interferometric measurement methods, in particular, are used here for highly accurate testing of the mirrors.

In this case, the use of computer-generated holograms (CGHs) is known, inter alia, wherein in particular at least one further "calibration functionality" for providing a reference wavefront that serves for calibration or error correction can be encoded in one and the same CGH in addition to the functionality that is required for the actual test (i.e. the CGH structure that is designed in accordance with the mirror shape for shaping the wavefront that mathematically corresponds to the test object shape).

Furthermore, it is also known, for example, in a Fizeau arrangement, to generate an interferogram between a reference wave reflected at a reference surface ("Fizeau plate") and a test wave reflected at the mirror.

One problem that occurs in practice is that the interferogram phase which is ascertained during the respective interferogram measurement and is used for the respective figure determination has further phase components besides the phase component that is actually to be determined (in accordance with the surface shape or figure of the test object). Said further phase components comprise, inter alia, polarization-induced phase components e.g. on account of diverse influences of the polarization state (such as, for example, as a result of birefringent layers present at optical elements, stress birefringence, etc.) which occur in the respective optical system and which corrupt the results obtained during the figure determination. Compensation or targeted computational extraction of said polarization-induced phase components requires as accurate knowledge thereof as possible. Polarization measurements that can be carried out for this purpose prove to be complex, however, and may again for their part exhibit errors.

Moreover, the aforementioned further phase components in the interferogram phase used to determine the figure also comprise those phase components which are caused by the respectively utilized diffractive structure or by the utilized computer-generated hologram. Defects in the three-dimensional structure of the diffractive structure or of the computer-generated hologram, for example in respect of etching depth, slope angle, etc., in this case also cause errors in the interferogram phase that cannot be compensated or removed by calculation and consequently lead to errors when determining the figure. The resultant problem is ever more severe as it was found that, in addition to a phase component dependent on the polarization, these phase components contain a phase component that is independent of the polarization in particular and that is normally greater than all other phase components which depend on the polarization and that does not disappear even in the case of measurements for linear input polarizations or measurements for any two desired orthogonal input polarizations and subsequent averaging of the measured interferogram phases—even if all optical components of the interferometer including the calibration mirror, reference mirror and the actual test mirror are perfectly adjusted and do not have any figure defects and if only the diffractive structure or CGH is non-ideal and hence afflicted by defects.

SUMMARY

Against the above background, it is an object of the present invention to provide a method and a device for characterizing the surface shape of an optical element which make possible an increased accuracy while at least partly avoiding the problems described above.

This object is achieved by the methods and respectively the devices in accordance with the features of the independent claims.

A method for characterizing the surface shape of an optical element, according to one formulation includes the following steps:

carrying out at least one first interferogram measurement on the optical element in an interferometric test arrangement by way of superposing on a test wave that was generated by diffraction of electromagnetic radiation at a diffractive element and reflected at the optical element a reference wave that has not been reflected at said optical element;

carrying out at least one further interferogram measurement, in each case on a calibration mirror for the purposes of determining calibration corrections; and determining the figure of the optical element on the basis of the first interferogram measurement carried out on the optical element and on the basis of the determined calibration corrections.

The method is characterized in that at least two interferogram measurements are carried out for the (at least one) calibration mirror, said interferogram measurements differing from one another in respect of the polarization state of the electromagnetic radiation.

In particular, aspects of the invention involve the concept of the implementation of at least one interferogram measurement on one or more calibration mirrors, additionally included for determining the figure of an optical element, being carried out not only once (and with a single input polarization) for each calibration mirror but multiple times for each calibration mirror, in each case with different input polarizations, and of the additional information obtained as a result likewise being taken into account when determining the calibration corrections which in turn should be included when actually determining the figure of the optical element.

As will still be described in more detail below, the aforementioned additional information provided from the different input polarizations at the calibration mirror or mirrors brings about, from a mathematical point of view, an enlargement of the system of equations which relates the respectively measured interferogram phases to known quantities (e.g., the fit of the calibration mirrors and the respective beam directions and the sensitivities to certain defects either calculated in the optical design or determined by way of measurements) and to unknown correction quantities (e.g., a lateral structure offset and a figure defect) which should be determined by way of solving the system of equations, with the consequence that—on account of the additionally set up equations—a greater number of correction quantities (inter alia, structure defects of the diffractive element) can be determined in turn.

In this case, aspects of the invention in particular also involve the concept of using the information available from the interferogram measurements carried out for different input polarizations on the calibration mirror or mirrors for the purposes of determining parameters which are characteristic for the three-dimensional structure of the diffractive element, for example for determining etching depth, slope angle, edge rounding and duty cycle. In this case, the duty cycle (also referred to as degree of fill) denotes the ratio between etched area and overall area on the diffractive element or CGH.

As a result, a substantially more accurate calibration of the diffractive element is obtained using the method according to the invention, with the consequence that the determination of the figure of the optical element to be characterized in respect of its surface shape is ultimately also implemented with a significantly increased accuracy.

In particular, according to aspects of the invention, different input polarizations (with a respective implementation of an associated interferogram measurement) are for instance not only set during an interferogram measurement on the optical element to be characterized in respect of its surface shape itself but rather are set on one or more calibration mirrors in order thus to determine structure defects of the diffractive element (in particular structure defects resulting from the three-dimensionality).

Expressed differently, aspects of the present invention are based in particular on an object of reducing the phase component which is caused by the diffractive element and which in addition to the actual phase component caused by the figure of the optical element occurs in the interferogram phase determined during the interferogram measurement on the optical element to be characterized in respect of its surface shape.

In this case, aspects of the invention also proceed from the idea that the above-described phase component caused only by the diffractive element outweighs the polarization-induced phase components by couplings of the polarization effects of the diffractive element with various polarization effects in the remaining optical system without the diffractive element itself. In this case, "polarization-induced phase components" means the coupling phase term; however, the latter only differs from zero if the diffractive structure also contains defects (i.e., without defects in the diffractive structure or without CGH defects there is no coupling phase term either).

According to an embodiment, the determination of calibration corrections comprises a determination of parameters characteristic for the three-dimensional structure of the diffractive element, in particular etching depth, slope angle, edge rounding and duty cycle.

According to an embodiment, the determination of parameters characteristic for the three-dimensional structure of the diffractive element is implemented by carrying out rigorous simulations.

According to an embodiment, the interferogram measurements for determining calibration corrections are carried out on at least two, in particular on at least three calibration mirrors.

According to an embodiment, at least two interferogram measurements, which differ in respect of the polarization state of the electromagnetic radiation, are carried out for each of these calibration mirrors.

According to an embodiment, in each case at least three, in particular at least four interferogram measurements, which differ in respect of the polarization state of the electromagnetic radiation, are carried out for each calibration mirror.

According to an embodiment, the figure of the optical element is determined on the basis of subtracting interferogram phases respectively obtained during said interferogram measurements. As a result of certain linear combinations of test-object measurements, in which the figure of the optical element or test object is eliminated by subtraction, further equations are available for determining the correction errors. Such linear combinations may comprise the difference in the interferogram phases for linear horizontal and vertical input polarization or else, for example, the difference between the difference in the interferogram phases for linear horizontal and vertical input polarization and the difference in the interferogram phases for the two orthogonal diagonal input polarizations. Moreover, such linear combinations may also comprise the difference between the mean values of the interferogram phases for linear horizontal and vertical input polarization and the mean values of the interferogram phases for the two orthogonal diagonal or circular input polarizations.

According to an embodiment, the figure of the optical element is further determined on the basis of averaging interferogram phases respectively obtained during said interferogram measurements. By averaging interferogram measurements, it is possible to reduce the phase component on account of polarization couplings between the diffraction structure of the diffractive element or CGH and the remaining system (including stress birefringence in the CGH substrate) in order thus to be able to reconstruct structure defects of the diffractive element or CGH, and hence also the figure of the optical element or mirror, with greater accuracy.

According to an embodiment, a plurality of interferogram measurements, which differ in respect of the polarization state of the electromagnetic radiation, are carried out on the optical element. As a result, the available information for the above-described system of equations which relates the respectively measured interferogram phases with known quantities (e.g., figure of the calibration mirrors and beam directions) to the structure defects to be determined (e.g., the lateral structure offset and the figure defect of the diffractive element) can be further increased.

According to another formulation, the invention also relates to a method for characterizing the surface shape of an optical element, the method including the following steps:
  carrying out a first interferogram measurement on the optical element in an interferometric test arrangement by way of superposing on a test wave that was generated by diffraction of electromagnetic radiation at a diffractive element and reflected at the optical element a reference wave that has not been reflected at said optical element;
  carrying out at least one second interferogram measurement on the optical element by superposing on a test wave that was generated by diffraction of electromagnetic radiation at the diffractive element and reflected at the optical element a reference wave that has not been reflected at the optical element, the first and the second interferogram measurement differing from one another in respect of the polarization state of the electromagnetic radiation; and
  determining parameters characteristic for the three-dimensional structure of the diffractive element on the basis of subtracting interferogram phases respectively obtained during these interferogram measurements, these parameters at least comprising one of the parameters of etching depth, slope angle, edge rounding and duty cycle.

According to an embodiment, the determined parameters characteristic for the three-dimensional structure of the diffractive element may also comprise all of the parameters of etching depth, slope angle, edge rounding and duty cycle.

According to an embodiment, at least three, in particular at least four interferogram measurements, which differ in respect of the polarization state of the electromagnetic radiation, are carried out on the optical element.

According to an embodiment, a plurality of interferogram measurements which differ from one another in respect of the polarization state of the electromagnetic radiation may be carried out also in a prior calibration on a calibration sample that is different than the optical element to be characterized with regard to the surface shape. Expressed differently, all interferogram measurements for all utilized input polarizations can be carried out for a certain test object that serves as a calibration sample, with only one measurement with a single input polarization then being carried out for further test objects and it being possible to convert to the interferogram phases with the remaining input polarizations (given a sufficient time stability of the test structure) on the basis of the interferogram measurement carried out in the case of the first test object or for the calibration sample.

In the case of sufficient time stability, it is possible to completely carry out all interferogram measurements for the calibration mirrors before the interferogram measurements for the first test object. However, it may also be necessary to carry out timely interferogram measurements on the calibration mirrors within the scope of each interferogram measurement of a test object (for example, due to changes in relative position of the reference mirror between interferogram measurements). As explained above, it is sufficient in this case to carry out interferogram measurements on the calibration mirrors for all input polarizations in advance and to carry out the actual interferogram measurements on the calibration mirrors for a single input polarization in a timely manner with respect to the measurements for the test surface.

According to an embodiment, calibration corrections are further determined on the basis of the interferogram measurements carried out on the optical element or on the calibration sample.

According to an embodiment, the interferogram measurements on the optical element and/or on a respective calibration mirror are carried out using electromagnetic radiation with a linear input polarization. As a result, the phase component on account of polarization couplings between the diffraction structure of the diffractive element or CGH and the remaining system in the interferogram phase can already be reduced from a measurement point of view, which in turn facilitates a more reliable determination of the figure of the optical element or test object.

According to an embodiment, the interferogram measurements on the optical element and/or on a respective calibration mirror are carried out using electromagnetic radiation with a linear input polarization in the direction of certain preferred directions of the system. As a result, the phase component on account of polarization couplings between the diffraction structure of the diffractive element or CGH and the remaining system in the interferogram phase can already be reduced from a measurement point of view, which in turn facilitates a more reliable determination of the figure of the optical element or test object.

According to an embodiment, the interferogram measurements on the optical element and/or on a respective calibration mirror are carried out using electromagnetic radiation for any two desired orthogonal input polarizations and subsequent averaging of the interferogram phases obtained. As a result, the above-described phase component on account of polarization couplings can be reduced even more than in the preceding paragraph from a measurement point of view, which in turn facilitates an even more reliable determination of the figure of the optical element or test object.

According to an embodiment, the interferogram measurements on the optical element and/or on a respective calibration mirror are carried out using electromagnetic radiation for at least one input polarization. In addition to the phase errors dependent on the polarization, the phase errors also contain as an error a phase contribution from the diffractive element or CGH, which phase contribution is independent of the polarization and normally significantly outweighs these phase errors. These circumstances can be exploited in order to determine computationally rigorous phase errors from the measured interferogram phases for the optical element and/or for one calibration mirror in each case, which in turn facilitates an even more reliable determination of the figure of the optical element or test object. By way of example, such a computational determination of rigorous errors can be implemented by virtue of initially decomposing certain rigorous disturbances in the diffractive element or CGH into special functional systems, then calculating the effects in the interferogram phase for the individual functions for each rigorous disturbance with optical ray tracing and determining the components in the interferogram phases for the phase distributions of rigorous errors, obtained thus, by way of a fit.

According to an embodiment, calibration corrections are further determined using at least one polarization correction element for reducing a component caused by polarization coupling between the diffractive element and the interferometric test arrangement in the interferogram phase respectively obtained during the interferogram measurements.

According to an embodiment, the interferogram measurements are carried out multiple times using a different diffractive element in each case.

According to an embodiment, the figure of the optical element is further determined on the basis of an additional evaluation of the contrast respectively obtained during said interferogram measurements.

According to an embodiment, a plurality of interferogram measurements, which differ in respect of the wavelength of the electromagnetic radiation, are carried out on the optical element and/or for at least one calibration mirror.

According to an embodiment, a plurality of interferogram measurements, which differ in respect of a system parameter, are carried out on the optical element and/or for at least one calibration mirror, with characteristic and measurable phase changes caused by the diffractive element occurring in the process.

According to an embodiment, the diffractive element is a computer-generated hologram (CGH).

The optical element to be characterized with regard to its surface shape can be a mirror, in particular. Furthermore, the optical element can be designed for an operating wavelength of less than 30 nm, in particular less than 15 nm. In particular, the optical element can be an optical element of a microlithographic projection exposure apparatus.

According to another formulation, the invention furthermore relates to a device for characterizing the surface shape of an optical element, in particular of an optical element of a microlithographic projection exposure apparatus, wherein the device is configured to carry out a method having the features described above. With regard to advantages and advantageous configurations of the device, reference is made to the above explanations in association with the method according to the invention.

Further configurations of the invention can be gathered from the description and the dependent claims.

The invention is explained in greater detail below on the basis of exemplary embodiments illustrated in the accompanying figures.

DETAILED DESCRIPTION

Figure 4:
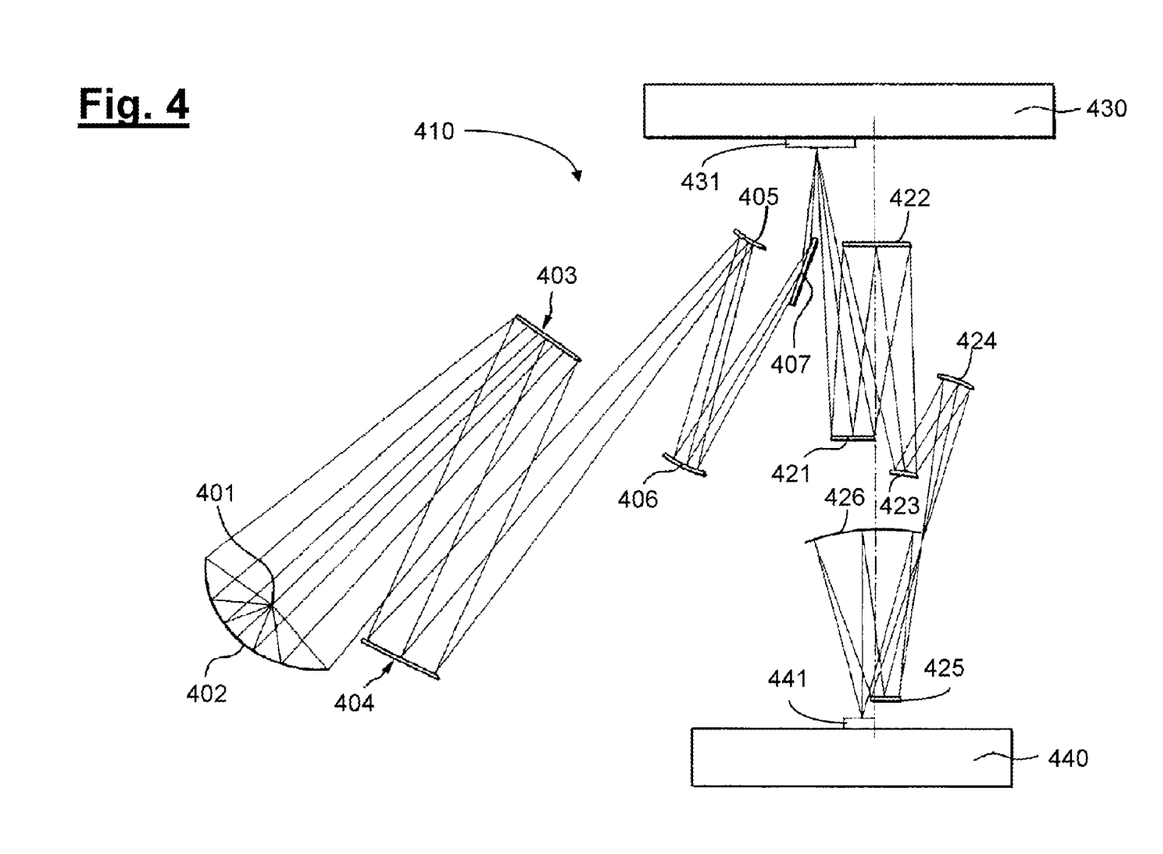
FIG. 4 shows a schematic illustration of a projection exposure apparatus designed for operation in EUV.

FIG. 4 firstly shows a schematic illustration of an exemplary projection exposure apparatus which is designed for operation in EUV and which comprises mirrors which are testable with methods according to the invention.

In accordance with FIG. 4, an illumination device in a projection exposure apparatus 410 designed for EUV comprises a field facet mirror 403 and a pupil facet mirror 404. The light from a light source unit comprising a plasma light source 401 and a collector mirror 402 is directed at the field facet mirror 403. A first telescope mirror 405 and a second telescope mirror 406 are arranged in the light path downstream of the pupil facet mirror 404. A deflection mirror 407 is arranged downstream in the light path, said deflection mirror directing the radiation that is incident thereon at an object field in the object plane of a projection lens comprising six mirrors 421-426. At the location of the object field, a reflective structure-bearing mask 431 is arranged on a mask stage 430, said mask being imaged with the aid of the projection lens into an image plane in which a substrate 441 coated with a light-sensitive layer (photoresist) is situated on a wafer stage 440.

The optical element which is tested by a method according to the invention in an interferometric test arrangement described below can be e.g. an arbitrary mirror of the projection exposure apparatus 410.

Figure 2:
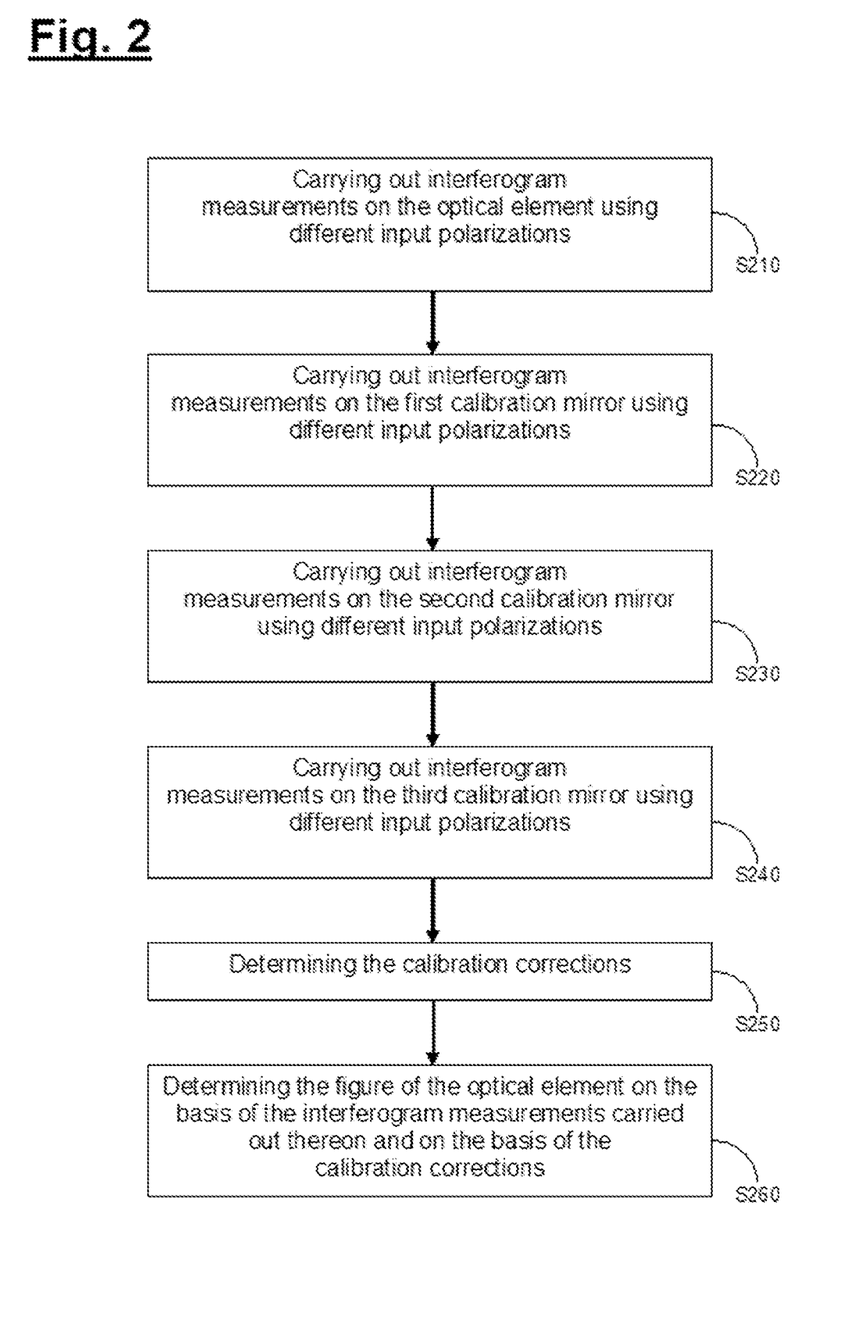
FIG. 2 shows a flowchart for explaining an exemplary embodiment of a method according to the invention.

FIG. 2 shows a flowchart illustrating multiple steps S210-S260 of an exemplary embodiment of a method according to the invention.

Figure 1:
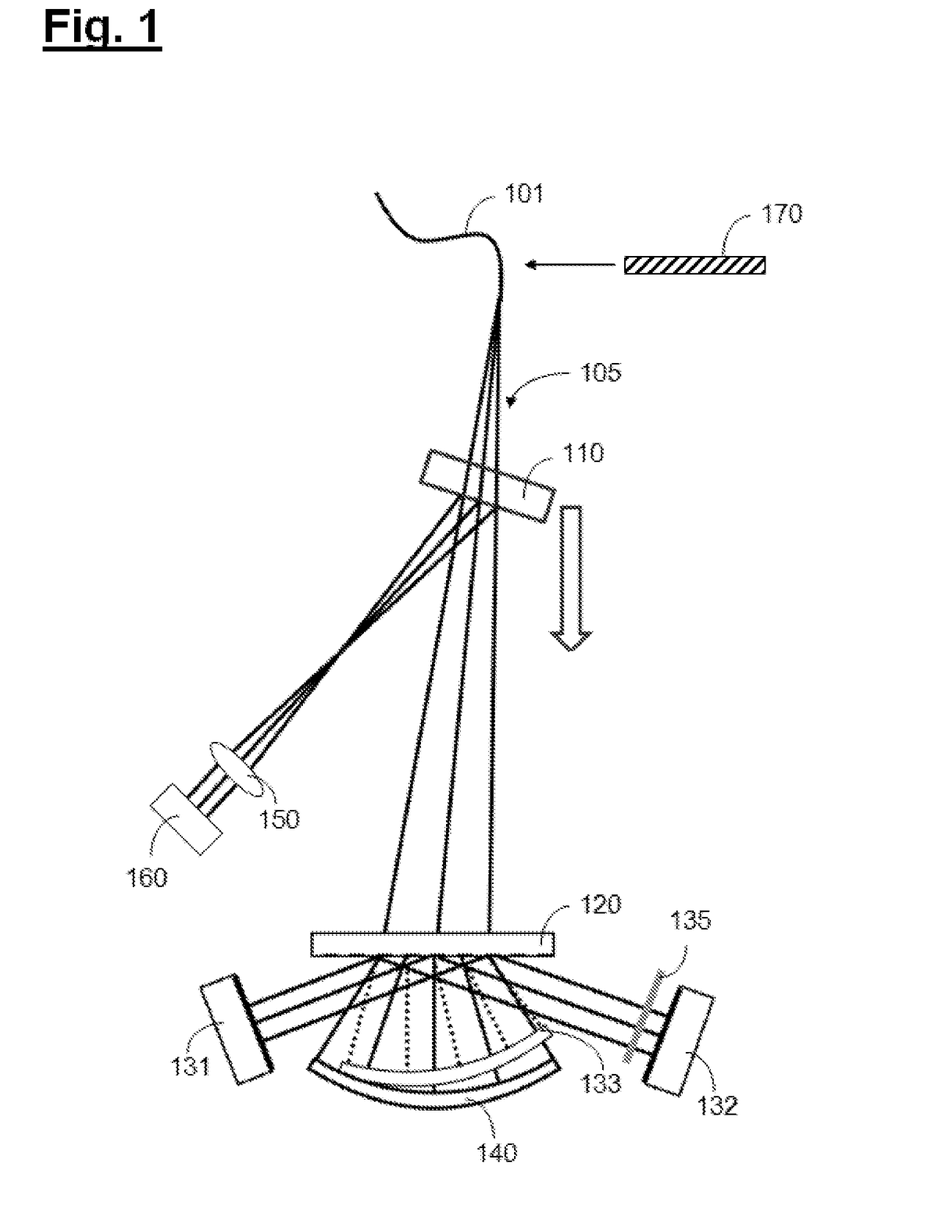
FIG. 1 shows a schematic illustration for explaining an exemplary configuration of an interferometric test arrangement that can be used in a method according to the invention.

FIG. 1 shows a schematic illustration for describing an exemplary configuration of an interferometric test arrangement for testing a mirror using a CGH.

In accordance with FIG. 1, the illumination radiation generated by a light source (not illustrated) and emerging from the exit surface of an optical waveguide 101 emerges as an input wave 105 having a spherical wavefront, passes through a beam splitter 110 and is then incident on a complexly coded CGH 120. The CGH 120 generates a total of four output waves from the input wave 105 in transmission in the example in accordance with its complex coding, one output wave of which impinges as a test wave on the surface of the optical element to be characterized with regard to its surface shape in the form of a mirror 140 with a wavefront adapted to the target shape of the surface of said mirror 140. Furthermore, the CGH 120 generates three further output waves from the input wave 105 in transmission, each of which further output waves is incident on a respective further reflective optical element 131, 132 and 133. In this case, any combination of in each case two of the reflective optical elements 131, 132 and 133 can be chosen in order to generate a reference wave in each case and a calibration wave in each case (that is to say, in principle each of the elements 131, 132 and 133 can be used alternatively as a reference mirror for generating the reference wave or as a calibration mirror for generating a calibration wave). The reference wave reflected at the respective reference mirror is made to interfere with the test wave reflected by the mirror 140 or with a calibration wave reflected by the respective calibration mirror. In this context, individual optical elements can temporarily be coupled out of the optical beam path by way of suitably designed shutters (of which only one shutter 135 is indicated schematically). The CGH 120 also serves for superposing the waves reflected by the reflective optical elements 131-133, which are incident as convergent beams again on the beam splitter 110 and are reflected from the latter in the direction of an interferometer camera 160 designed as a CCD camera, in the course of which they pass through an eyepiece 150. The interferometer camera 160 captures an interferogram generated by the interfering waves, the actual shape of the optical surface of the mirror 140 being determined from said interferogram by way of an evaluation device (not shown).

A polarization-influencing element 170, indicated schematically in FIG. 1, serves to set a desired input polarization in targeted fashion, said element being able to be designed in any desired suitable way and being able to be arranged variably within the optical beam path. In embodiments, it is possible to use a suitable polarizer for setting linear polarization in combination with a half-wave plate for switching between the respective polarization directions. In further embodiments, it is possible to use a suitable polarizer in combination with a rotatable half-wave plate and a rotatable quarter-wave plate for setting orthogonal linear and circular input polarizations.

In FIG. 1, a further polarization-influencing element can be used instead of the shutter 135, or in addition to this shutter, in the beam path upstream of the reference mirror. In a manner similar to the element 170, the polarization-influencing element 135 also serves to manipulate the polarization with the object of in this way obtaining additional information for determining the calibration corrections to be considered when determining the figure. In further embodiments, use can be made of a suitable polarizer or a retardation element in the form of a rotatable and sufficiently thin plate that has surfaces that are as plane and as parallel as possible. If the reference mirror is embodied as a plane mirror, a plane wavefront is incident on the polarization-influencing element 135. As a result, the angular load and hence also an additional polarization error introduced by the element 135 are small. Geometric phase errors, which are consequently independent of the polarization and which are caused by surface defects or refractive index inhomogeneities of the element 135, for example, can be removed by calculation together with a figure defect of the reference mirror. The element 135 can also be used to implement a phase modulation in the interferogram measurements (instead of a phase modulation as a result of displacing the reference mirror, for example).

Now, one insight associated with the invention is the concept, known per se, of also including calibration corrections when determining the figure of the mirror 140, said calibration corrections being implemented on the basis of calibration measurements on the reflective optical elements 131-133 serving as calibration mirrors in this respect. According to the invention, interferogram measurements, especially on these calibration mirrors and possibly also on the mirror to be characterized in respect of its surface shape, are respectively carried out not only once but multiple times with different input polarizations in each case in order thus to obtain additional information for determining the calibration corrections to be included when determining the figure.

The following mathematical consideration shows that an increase in the system of equations (within the meaning of providing additional equations) is obtained in this way, said system of equations relating the respectively measured interferogram phases with known quantities and with unknown structure defects of the employed diffractive element to be determined on the basis of solving the system of equations. Accordingly, it is ultimately possible to determine a greater number of structure defects of the diffractive element. With the additional equations it is possible in general to deduce polarization-dependent defects (and not only structure defects of the CGH). According to the invention, it is possible in particular to additionally determine parameters which are characteristic for the three-dimensional structure of the diffractive element or CGH, for example etching depth, slope angle, edge rounding and duty cycle or degree of fill.

Starting point for the mathematical consideration is that on the basis of three calibration mirrors on which a respective interferogram measurement is carried out it is possible to determine three unknown quantities in accordance with the following system of equations of three equations (1)-(3):

An interpolation is carried out during the calibration according to the invention, with the wavenumber vectors ("k-vectors") of the calibration waves spanning a tetrahedron following the diffraction of the light coming from the light source, said tetrahedron including the direction of the wavenumber vector of the test wave (such that the wavenumber vector of the test wave is located within the tetrahedron). The unknown quantities or errors in the interferogram phases of the test object and calibration mirrors, which are independent of the input polarization, which are added to the phase component actually to be determined (corresponding to the surface shape or figure of the test object) and which are determined by calibration can be decomposed into a constant component or error $c_0$ and two (error) components $c_x$ and $c_y$ that are linear in terms of the wavenumber vectors, the following interpolation scheme arising:

$$\varphi_{K1} = \varphi_{K1}^P + 2k'_{x,K1} \cdot c_x + k'_{y,K1} \cdot c_y + c_0 \quad (1)$$

$$\varphi_{K2} = \varphi_{K2}^P + 2k'_{x,K2} \cdot c_x + k'_{y,K2} \cdot c_y + c_0 \quad (2)$$

$$\varphi_{K3} = \varphi_{K3}^P + 2k'_{x,K3} \cdot c_x + k'_{y,K3} \cdot c_y + c_0 \quad (3)$$

The errors $c_0$, which yield phase components that are independent of the input polarization, constant in terms of wavenumber vectors and identical for the test surface and the calibration mirrors, for example are, inter alia, figure defects on the reference mirror, and the errors $c_x$ and $c_y$, which yield phase components that are independent of the input polarization and linear in terms of wavenumber vectors, are in particular lateral structure offset defects in the diffractive element or CGH.

In addition to the phase component actually to be determined (corresponding to the surface shape or figure of the test object) and, in particular, in addition to figure defects on the reference mirror and lateral structure offset defects in the diffractive element or CGH, the interferogram phase contains further phase components, specifically a scalar phase component of the diffractive element or CGH, and polarization-induced phase components of both the diffractive element or CGH on its own and on account of the coupling of the diffractive element or CGH with the remaining optical system.

The present invention now targets a reduction in the phase component in the interferogram phase generated by the diffractive element or CGH. According to the invention, this is achieved by virtue of the aforementioned calibration being extended in respect of the determination of structure defects of the diffractive element or CGH by virtue of a plurality of interferogram measurements (that is to say at least two measurements) with in each case a different polarization state of the electromagnetic radiation being carried out for each calibration mirror. The more accurate knowledge of the diffractive structure of the diffractive element or CGH obtained according to the invention as a result in turn facilitates a more accurate determination of the phase components in the interferogram caused thereby and subtraction thereof from the obtained interferogram phase.

Overall, the following system of equations arises:

$$\varphi_{K,p} - \varphi_K^P - \varphi_{K,p,0}^C = 2k'_{x,K} \cdot c_x + 2k'_{y,K} \cdot c_y + c_0 + \sum_{m=1}^{M} \varphi_{K,p,m}^C \cdot \delta c_m \quad (4)$$

In this case, $\varphi_{K,p}$ denotes the interferogram phases measured for the respective calibration mirrors in the case of input polarization p, $\varphi_K^P$ denotes the figure of the respective calibration mirrors in the case of input polarization p, $\varphi_{K,p,0}^C$ denotes the nominal phase or phase calculated in the optical design (with the inclusion of rigorous simulations) and $\varphi_{K,p,m}^C$ denotes the sensitivities of the defects of the diffractive element or CGH (optionally likewise calculated with the inclusion of rigorous simulations). Further, quantities dependent on the polarization are denoted by an additional index p.

Then, the figure of the optical element to be characterized in terms of its surface shape can be calculated according to the following equations:

$$\varphi_S^P = \varphi_{S,p} - \varphi_{S,p,0}^C - 2k'_{x,S} \cdot c_x - 2(k')_{y,S} \cdot c_y + c_0 - \sum_{m=1}^{M} \varphi_{S,p,m}^C \cdot \delta c_m \quad (5)$$

In this case, $\delta c_m$ denotes the unknown quantities (rigorous defects of the diffractive element or CGH such as, e.g., etching depth, slope angle, edge rounding and duty cycle and, e.g., quantities of a polarization correction element), $\varphi_{S,p,0}^C$ and $\varphi_{S,p,m}^C$ denote the phases for the nominal and disturbed system calculated in the optical design (with the inclusion of rigorous simulations) in the case of input polarization p, and $\varphi_{S,p}$ denotes the interferogram phases measured for the optical element or the test object to be characterized in respect of its surface shape, in the case of input polarization p.

Instead of the calculation method consisting of the system of equations (4) and equation (5), it is also possible to set up the common system of equations for the calibration mirrors and the test surface (in the case of three calibration mirrors here in exemplary fashion)

$$\varphi_{K1,p} - \varphi_{K1}^P - \varphi_{K1,p,0}^C = 2k'_{x,K1} \cdot c_x + 2k'_{y,K1} \cdot c_y + c_0 + \sum_{m=1}^{M} \varphi_{K1,p,m}^C \cdot \delta c_m \quad (6)$$

$$\varphi_{K2,p} - \varphi_{K2}^P - \varphi_{K2,p,0}^C = 2k'_{x,K2} \cdot c_x + 2k'_{y,K2} \cdot c_y + c_0 + \sum_{m=1}^{M} \varphi_{K2,p,m}^C \cdot \delta c_m$$

$$\varphi_{K3,p} - \varphi_{K3}^P - \varphi_{K3,p,0}^C = 2k'_{x,K3} \cdot c_x + 2k'_{y,K3} \cdot c_y + c_0 + \sum_{m=1}^{M} \varphi_{K3,p,m}^C \cdot \delta c_m$$

$$\varphi_{S,p} - \varphi_{S,p,0}^C = 2k'_{x,S} \cdot c_x + 2k'_{y,S} \cdot c_y + c_0 + \sum_{m=1}^{M} \varphi_{S,p,m}^C \cdot \delta c_m + \varphi_S^P$$

by virtue of the figure of the test surface $\varphi_S^P$ being formulated to be the quantity to be determined by solving this system of equations. In the case of three calibration mirrors and $N_p$ different input polarizations in the interferogram measurements for the calibration mirrors and the test surface, a total of $4 \cdot N_p$ equations are available, as a result of which $4 \cdot N_p - 4$ further unknowns $\delta c_m$, which may be for example rigorous defects of the diffractive element or CGH or other polarization errors, can be determined in addition to the unknowns $\varphi_S^P$, $c_x$, $c_y$ and $c_o$. Thus, four e.g. rigorous errors $\delta c_m$ can be determined in the case of two different input polarizations, this even increasing to 12 in the case of four different input polarizations. In the case of two or four different input polarizations, it is advantageous to use linear input polarizations in the horizontal and vertical directions and in the two diagonal directions in the interferogram measurements since linear input polarizations reduce the phase component due to polarization coupling between the diffractive structure of the diffractive element or CGH and the remaining system.

As a result of the introduction of a suitable virtual polarization correction element, it is possible to determine correction quantities which reduce the phase component due to polarization coupling between the diffractive structure of the diffractive element or CGH and the remaining system. In the process, polarization errors in the remaining optical system are "removed by calibration" in addition to the (CGH) structure defects, as a result of which the actual structure quantities of the diffractive element or CGH can be reconstructed more accurately by the calibration, and as a result of which the figure of the test object can be determined more accurately.

Such a virtual polarization correction element describes a polarization effect by way of a Jones matrix directly in front of the structured side of the diffractive element or CGH and may represent a combination of a pure dichroic element and a purely retarding element, this being able to be based on a linear dichroic and linear retarding effect in particular. The corresponding Jones matrices for linear dichroism and linear retardation are as follows:

$$J_D = \sigma_0 + \tanh(\mu)[\cos(2\beta_D)\sigma_1 + \sin(2\beta_D)\sigma_2] = \sigma_0 + d_1\sigma_1 + d_2\sigma_2 \quad (7)$$

$$J_R = \sigma_0 + i\tan(\delta)[\cos(2\beta_R)\sigma_1 + \sin(2\beta_R)\sigma_2] = \sigma_0 + ir_1\sigma_1 + ir_2\sigma_2 \quad (8)$$

with the magnitudes and axis orientations for dichroism and retardation of $$\tanh(\mu) = \sqrt{d_1^2 + d_2^2}, \quad \tan(2\beta_D) = \frac{d_2}{d_1} \quad (9)$$

$$\tanh(\delta) = \sqrt{r_1^2 + r_2^2}, \quad \tan(2\beta_R) = \frac{r_2}{r_1} \quad (10)$$

The Jones matrix of the virtual polarization correction element now is the product of the two Jones matrices for linear dichroism and linear retardation, where quadratic and hence also circular components in the product may be considered negligible under the approximation that the magnitudes of dichroism and retardation are small.

$$J_{PCE} = J_D \cdot J_R \approx \sigma_0 + d_1\sigma_1 + d_2\sigma_2 + ir_1\sigma_1 + ir_2\sigma_2 \quad (11)$$

Now, the error quantities $$d_1, d_2, r_1, r_2 => \mu, \beta_D, \delta, \beta_R \quad (12)$$

are determined in an extended calibration.

In embodiments, a plurality of polarization correction elements may be virtually inserted into the system at suitable locations. Eight parameters to be corrected are present if two polarization correction elements are used. In embodiments, in particular, a virtual polarization correction element can be used directly in front of the diffractive structure of the diffractive element or CGH, and only in the forward direction, in order to capture the polarization errors from the illumination to the diffractive structure, and a second virtual polarization correction element can be used behind an AR layer of the interferometer camera, the polarization errors in the optical system from the diffractive structure to the interferometer camera being captured by way of the latter polarization correction element.

In embodiments, it is also possible to carry out measurements on the same test structure with a plurality of different diffractive elements or CGHs. To determine the polarization-induced phase component as a result of polarization coupling of the (CGH) diffraction structure with the remaining system, it is possible in this case to exploit that when only the CGH is replaced, the structure of the interferometric test arrangement up to the diffractive structure of the CGH, and from there to the interferometer camera, remains unchanged in each case. Thus, if the measurements from one and the same test structure are evaluated for a plurality of different CGHs, it is possible as a matter of principle to determine the errors in the polarization (within the meaning of the difference to the nominal system) for the remaining system (without CGH diffraction structure).

When exchanging the CGH, it should be observed that this changes not only the polarization effect of the diffractive structure but also the polarization effect of the CGH substrate. By way of example, stress birefringence in the substrate may be problematic in this case. This stress birefringence remains in the calculation as an unknown and leads to errors as a result. By measurements with different CGHs and, as a rule, the same reference and calibration mirrors, it is possible to merge the respective systems of equations and the parameters of a virtual polarization correction element can be determined as a common unknown. Expressed differently, the equations for all CGHs can be combined into a larger system of equations, with the correction quantities for the polarization correction elements being the same for all CGHs, and so effectively there is a greater number of equations available for fewer unknowns. This not only provides the option of determining the parameters of the virtual polarization correction element ("PCE parameters") more accurately but also of formulating further unknowns in the calibration step.

Moreover, measurements for calibration and test mirrors on the same test structure with a plurality of different diffractive elements or CGHs in the case of the same test surface are advantageous because this, in a manner analogous to the explanation above, increases the number of equations by merging the systems of equations for the respective CGHs since in addition to, e.g., the parameters of a virtual polarization correction element the figure of the test surface $\varphi_S^P$ to be characterized is a common unknown. In this case, the use of an input polarization can be advantageous in the interferogram measurements for the calibration mirrors and the test surface itself because this, by way of solving a system of equations, allows the determination of more error quantities that are independent of the polarization.

In further embodiments, it is also possible to carry out measurements on calibration CGHs with specific known structure defects and a comparatively small polarization effect (in particular, a low stress birefringence) of the CGH substrate such that advantageously structure disturbances can also be partly detected by measurement (and not by way of the simulation).

In further embodiments, measurements can also be carried out on specific calibration polarization elements that have been introduced into the test system and that alter the polarization such that advantageously errors in the polarization (within the meaning of the difference to the nominal system) for the remaining system (without CGH diffraction structure) can also be partly detected by measurement (and not by way of the simulation).

In embodiments, the contrast and the intensity in the interferogram (for calibration mirrors and test object and for different input polarizations) can also be evaluated in addition to an evaluation of the phase in the interferogram, with the contrast and the intensity likewise having components dependent on the polarization and independent thereof. Since, to the lowest order, the test object figure does not contribute to the contrast, additional equations arise with the evaluation of the contrast for the test object and for the calibration mirrors. In the case of three calibration mirrors and interferogram measurements for the test object and the calibration mirrors for in each case $N_p$ different input polarizations, $4 \cdot N_p$ additional equations arise. In addition to the figure of the test surface, the number of quantities determinable by solving the system of equations, for example when using three calibration mirrors with two different input polarizations increases from $4 \cdot 2 - 1 = 7$ to $7 + 4 \cdot 2 = 15$, and increases from $4 \cdot 4 - 1 = 15$ to $15 + 4 \cdot 4 = 31$ equations in the case of four different input polarizations.

In embodiments of the invention (and in the case of a sufficient temporal stability of the interferometric test arrangement), the interferogram measurements on the calibration mirrors can be carried out before the interferogram measurements on the optical element to be characterized in terms of its surface shape or on the test object. Moreover, all interferogram measurements for all utilized input polarizations can be carried out for a certain test object, with only one measurement with a single input polarization then being carried out for further test objects and it being possible to convert to the interferogram phases with the remaining input polarizations on the basis of the interferogram measurement carried out in the case of the first test object.

Figure 3:
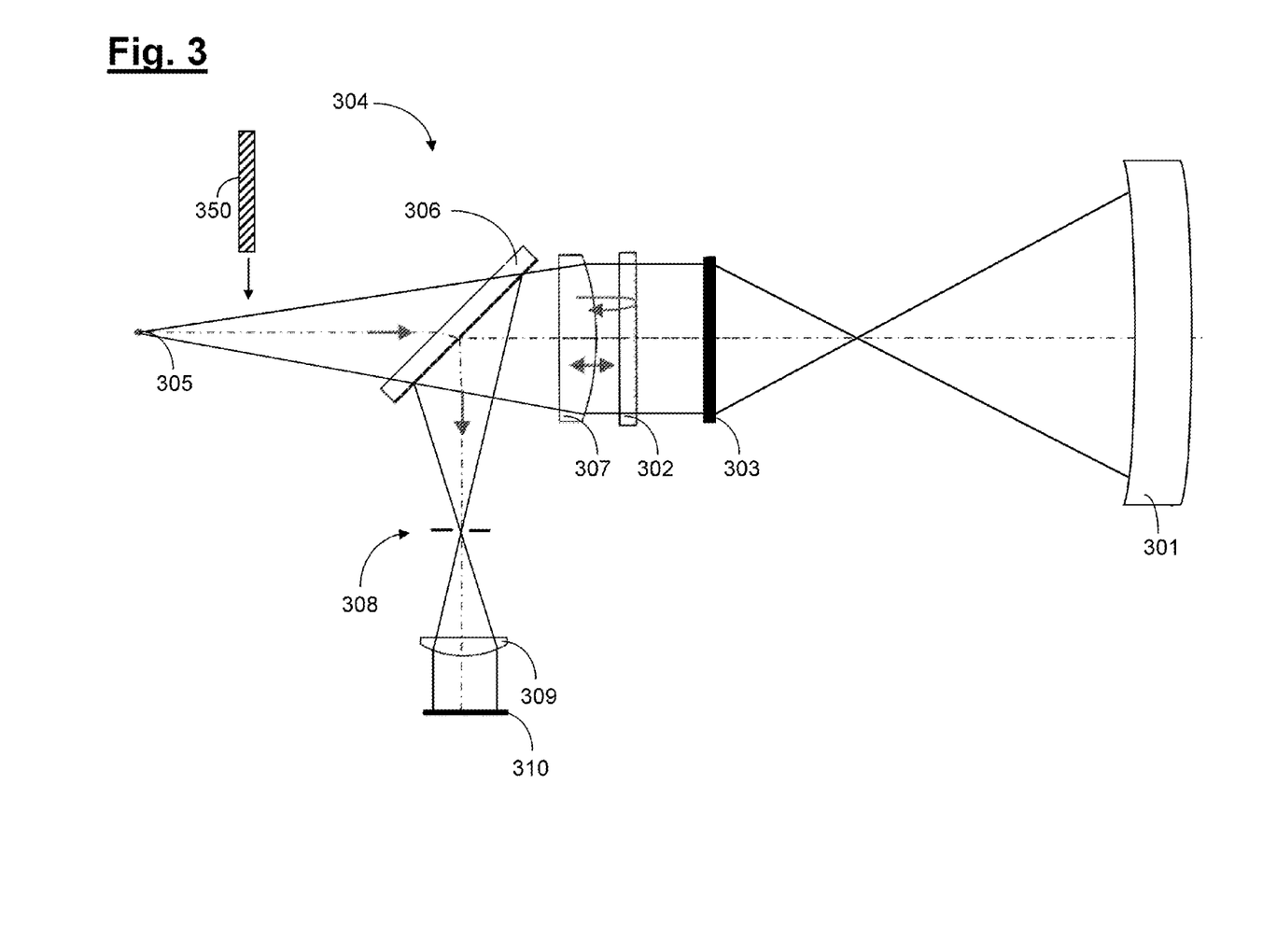
FIG. 3 shows a schematic illustration for explaining a further exemplary configuration of an interferometric test arrangement that can be used in a method according to the invention.

FIG. 3 shows as an alternative to FIG. 1 a further exemplary configuration of an interferometric test arrangement.

In accordance with FIG. 3, in a Fizeau arrangement, an interferogram is generated between a reference wave reflected at a reference surface 302 ("Fizeau plate") and a test wave reflected at a mirror 301. In this case, the measurement light is shaped by a CGH 303 to form a wavefront that corresponds mathematically exactly to the "test object shape" (i.e. the shape of the relevant mirror 301) at a target distance. The wavefronts reflected firstly from the reference surface 302 and secondly from the relevant mirror 301 or test object interfere with one another in an interferometer 304 comprising, in accordance with FIG. 3, a light source 305, a beam splitter plate 306, a collimator 307, a stop 308, an eyepiece 309 and a CCD camera 310. An interferogram of the respective mirror 301 is recorded with the CCD camera 310.

Here, too, the corresponding input polarization is set using a polarization-influencing element 350, which is indicated merely schematically in FIG. 3 and which, analogously to FIG. 1, can be configured and arranged variably in the optical beam path in any suitable way.

Even though the invention has been described on the basis of specific embodiments, numerous variations and alternative embodiments will be apparent to a person skilled in the art, for example through combination and/or exchange of features of individual embodiments. Accordingly, persons skilled in the art will view such variations and alternative embodiments as being concomitantly encompassed by the present invention, and consider the scope of the invention to be restricted only within the meaning of the appended patent claims and the equivalents thereof.

What is claimed is:

1. A method for characterizing a surface shape of an optical element, the method comprising:
   a) carrying out at least one first interferogram measurement, said first interferogram measurement being carried out on the optical element in an interferometric test arrangement by superposing a reference wave, which has not been reflected at the optical element, on a test wave, which has been generated by diffraction of electromagnetic radiation at a diffractive element and reflected at the optical element;
   b) carrying out second interferogram measurements, said second interferogram measurements being carried out on a calibration mirror for determining calibration corrections, wherein the second interferogram measurements comprise a first-polarization-state measurement and a second-polarization-state measurement, wherein the first-polarization state differs from the second-polarization state; and
   c) determining a figure of the optical element based on both the first interferogram measurement carried out on the optical element and on the determined calibration corrections.

2. The method as claimed in claim 1, wherein said determining of the calibration corrections comprises a determination of parameters characterizing a three-dimensional structure of the diffractive element.

3. The method as claimed in claim 2, wherein the parameters characterizing the three-dimensional structure of the diffractive element include at least one of: etching depth, slope angle, edge rounding, and duty cycle.

4. The method as claimed in claim 2, wherein the determination of the parameters characterizing the three-dimensional structure of the diffractive element is implemented with simulations.

5. The method as claimed in claim 1, wherein the second interferogram measurement, carried out in said step b), is carried out on at least two calibration mirrors.

6. The method as claimed in claim 5, wherein at least two of the second interferogram measurements, which differ in respect of the polarization state of the electromagnetic radiation, are carried out for each of the calibration mirrors.

7. The method as claimed in claim 1, wherein at least three of the interferogram measurements, which differ in respect of the polarization state of the electromagnetic radiation, are carried out for at least the calibration mirror.

8. The method as claimed in claim 1, wherein the figure of the optical element is determined based on subtracting interferogram phases respectively obtained during the first and the second interferogram measurements.

9. The method as claimed in claim 1, wherein the figure of the optical element is determined based on an averaging of interferogram phases respectively obtained during the first and the second interferogram measurements.

10. The method as claimed in claim 1, further comprising carrying out further ones of the first interferogram measurements on the optical element, wherein the further ones of the first interferogram measurements differ from the at least one first interferogram measurement in respective polarization states of the electromagnetic radiation.

11. The method as claimed in claim 1, further comprising determining the figure of the optical element based on an additional evaluation of contrast respectively obtained during the first and/or the second interferogram measurements.

12. The method as claimed in claim 1, wherein a plurality of the first and/or the second interferogram measurements, which differ in wavelength of the electromagnetic radiation, are carried out on the optical element and/or for at least one calibration mirror.

13. The method as claimed in claim 1, wherein the diffractive element is a computer-generated hologram (CGH).

14. The method as claimed in claim 1, wherein the optical element is a mirror.

15. The method as claimed in claim 1, wherein the optical element is configured for an operating wavelength of less than 30 nm.

16. The method as claimed in claim 1, wherein the optical element is an optical element of a microlithographic projection exposure apparatus.

17. A device for characterizing a surface shape of an optical element, comprising:
   a beam splitter configured to output an input wave onto a complexly coded computer-generated hologram (CGH),
   an interferometric test arrangement comprising the CGH and at least three mirrors,
   wherein the interferometric test arrangement is configured to generate four output waves from the input wave,
   wherein the interferometric test arrangement is configured to carry out the method as claimed in claim 1, and
   wherein the four output waves comprise the reference wave, the test wave and a calibration wave.

18. A method for characterizing a surface shape of an optical element, the method comprising:
   a) carrying out a first interferogram measurement, said first interferogram measurement being carried out on the optical element in an interferometric test arrangement by superposing a first reference wave, which has not been reflected at the optical element, on a first test wave, which has been generated by diffraction of electromagnetic radiation at a diffractive element and reflected at the optical element;
   b) carrying out at least one second interferogram measurement, said second interferogram measurement being carried out on the optical element by superposing a second reference wave, which has not been reflected at the optical element, on a second test wave, which has been generated by diffraction of electromagnetic radiation at the diffractive element and reflected at the optical element, wherein the first and the second interferogram measurements differ from one another in polarization state of the electromagnetic radiation; and
   c) determining parameters characterizing a three-dimensional structure of the diffractive element based on subtracting interferogram phases obtained respectively during the first interferogram measurement and the second interferogram measurement, wherein the parameters comprise at least one of etching depth, slope angle, edge rounding and duty cycle.

19. The method as claimed in claim 18, wherein at least three of the second interferogram measurements, which differ in the polarization state of the electromagnetic radiation, are carried out on the optical element.

20. The method as claimed in claim 18, wherein a plurality of prior interferogram measurements which differ from one another in the polarization state of the electromagnetic radiation are carried out in a prior calibration on a calibration sample that is different than the optical element being characterized with regard to the surface shape.

21. The method as claimed in claim 20, wherein calibration corrections are further determined based on the second interferogram measurements carried out on the optical element or the calibration sample.

22. The method as claimed in claim 18, wherein the second interferogram measurement is carried out using electromagnetic radiation with a linear input polarization.

23. The method as claimed in claim 18, further comprising determining calibration corrections and reducing a component caused by polarization coupling between the diffractive element and the interferometric test arrangement in the interferogram phases respectively obtained during the first interferogram measurement.

24. The method as claimed in claim 18, wherein the first and/or the second interferogram measurements are carried out multiple times using respectively differing diffractive elements.

\* \* \* \* \*

UNITED STATES PATENT AND TRADEMARK OFFICE
CERTIFICATE OF CORRECTION

PATENT NO. : 11,927,500 B2
APPLICATION NO. : 17/720344
DATED : March 12, 2024
INVENTOR(S) : Steffen Siegler et al.

It is certified that error appears in the above-identified patent and that said Letters Patent is hereby corrected as shown below:

In the Specification

In Column 11, Lines 27-28, delete:

" $$\varphi_S^P = \varphi_{S,p} - \varphi_{S,p,0}^C - 2K'_{x,S} \cdot c_x - 2(k')_{y,S} \cdot c_y + c_0 - \sum_{m=1}^{M} \varphi_{S,p,m}^C \cdot \delta c_m$$ "

And insert:

-- $$\varphi_S^P = \varphi_{S,p} - \varphi_{S,p,0}^C - 2k'_{x,S} \cdot c_x - 2k'_{y,S} \cdot c_y + c_0 - \sum_{m=1}^{M} \varphi_{S,p,m}^C \cdot \delta c_m$$ --.

Signed and Sealed this
Tenth Day of September, 2024

Katherine Kelly Vidal
*Director of the United States Patent and Trademark Office*